United States Patent [19]

Kamimura

[11] Patent Number: 5,033,969

[45] Date of Patent: Jul. 23, 1991

[54] SUPPORT DEVICE FOR RESOLVING QUESTIONS ABOUT REPRODUCED INFORMATION

[75] Inventor: Hiroshi Kamimura, Saitama, Japan

[73] Assignee: Pioneer Electronic Corporation, Tokyo, Japan

[21] Appl. No.: 493,052

[22] Filed: Mar. 13, 1990

[30] Foreign Application Priority Data

Jul. 21, 1989 [JP] Japan .................................. 1-189590

[51] Int. Cl.⁵ .............................................. G09B 5/00
[52] U.S. Cl. .................................... 434/322; 434/307; 434/309; 434/323; 364/521
[58] Field of Search ................ 434/322, 327, 336, 323, 434/309, 307

[56] References Cited

U.S. PATENT DOCUMENTS 4,234,933 11/1980 Adelson et al. .................. 434/322 X
4,333,152 6/1982 Best ................................. 434/323 X
4,468,204 8/1984 Scott et al. .......................... 434/309
4,689,022 8/1987 Peers et al. ......................... 434/307

Primary Examiner—Richard J. Apley
Assistant Examiner—Glenn E. Richman
Attorney, Agent, or Firm—Sughrue, Mion, Zinn Macpeak & Seas

[57] ABSTRACT

A support device for resolving questions provided with a question input unit for selective input of questions on information reproduced from an information reproducing unit. A question input unit is connected with a question extracting unit. If a question is input, the question extracting unit presents a plurality of prospective questions in the form of video information on a display unit and extracts a real question which coincides with questioner's question. The question extracting unit is connected with an answer unit, which automatically retrieves answer information on the extracted real question, and presents the answer information by video or audio information.

18 Claims, 14 Drawing Sheets

FIG. 15

| Select your question |
|---|
| 1. What is the wave-edged knife ? <br> 2. How was the sponge made ? <br> 3. Why is the sponge halved ? <br> 4. Sound was not completely heard. |

FIG. 16

```
*frame Image synchronized data 1
    Start frame    10256
    End frame      15000
  Prospective question
        What is the wave-edged knife ?
        How was the sponge made ?
        Why is the sponge halved ?
        Sound was not completely heard.
```

FIG. 17

| Understood ? |
|---|
| 1. Yes |
| 0. No |

1

SUPPORT DEVICE FOR RESOLVING QUESTIONS ABOUT REPRODUCED INFORMATION

BACKGROUND OF THE INVENTION

This invention relates to a device to support resolution of questions concerning information reproduced from storage media such as various educational videotapes.

When watching a video, we often have questions about, or want to be given detailed explanation for, a person or thing appearing in the video or his speech. At present, such questions are resolved by consulting references (for example, a dictionary and encyclopedia) or by asking other persons.

Such actions are troublesome and may make the person lose his interest in the video in many cases. For this reason, questions arising at the time of watching the video are almost left unresolved.

SUMMARY OF THE INVENTION

The purpose of this invention is to provide support device of resolving questions about reproduced information during viewing the information on the real-time basis.

The device of this invention comprises a question input unit for inputting selectively a question on reproducible information reproduced with an information reproducing unit, a question extracting unit for presenting several pieces of prospective question information in relation to the question on the basis of input information from said question input unit to extract a real question on the basis of input information for selecting said prospective question information input from said question input unit, and an answer unit for automatically retrieving and presenting answer information on said real question extracted with the question extracting unit.

When a question arises in condition where reproducible information is being reproduced by the information reproducing unit, the viewer inputs a question by the question input unit. The question extracting unit presents several pieces of prospective question information corresponding to the reproduced information, which have been previously stored as expected. The viewer selects from the presented pieces of prospective question information one piece of question information which coincides with the viewer's own question, and inputs the selected piece of question into the question input unit. As a result, the question extracting unit transmits the selected question information into the answering unit as real question information.

The answering unit automatically retrieves an answer corresponding to the real question information previously prepared, and outputs the answer information to the answer information display unit. If the output answer information is not satisfactory to the viewer, the above-mentioned operations are repeated.

As mentioned above, this invention can resolve the questions arising in the reproduced information during viewing the information immediately on the spot and on the real-time basis.

Preferred embodiments of the invention will now be described with reference to the accompanying drawings.

BRIEF DESCRIPTION OF THE DRAWINGS

In the accompanying drawings:

FIG. 15 is a display example of prospective questions;

FIG. 16 is a display example of data on prospective questions; and

FIG. 17 is a display example of inquiry on understanding of a retrieval result.

DESCRIPTION OF THE PREFERRED EMBODIMENTS

Figure 1:
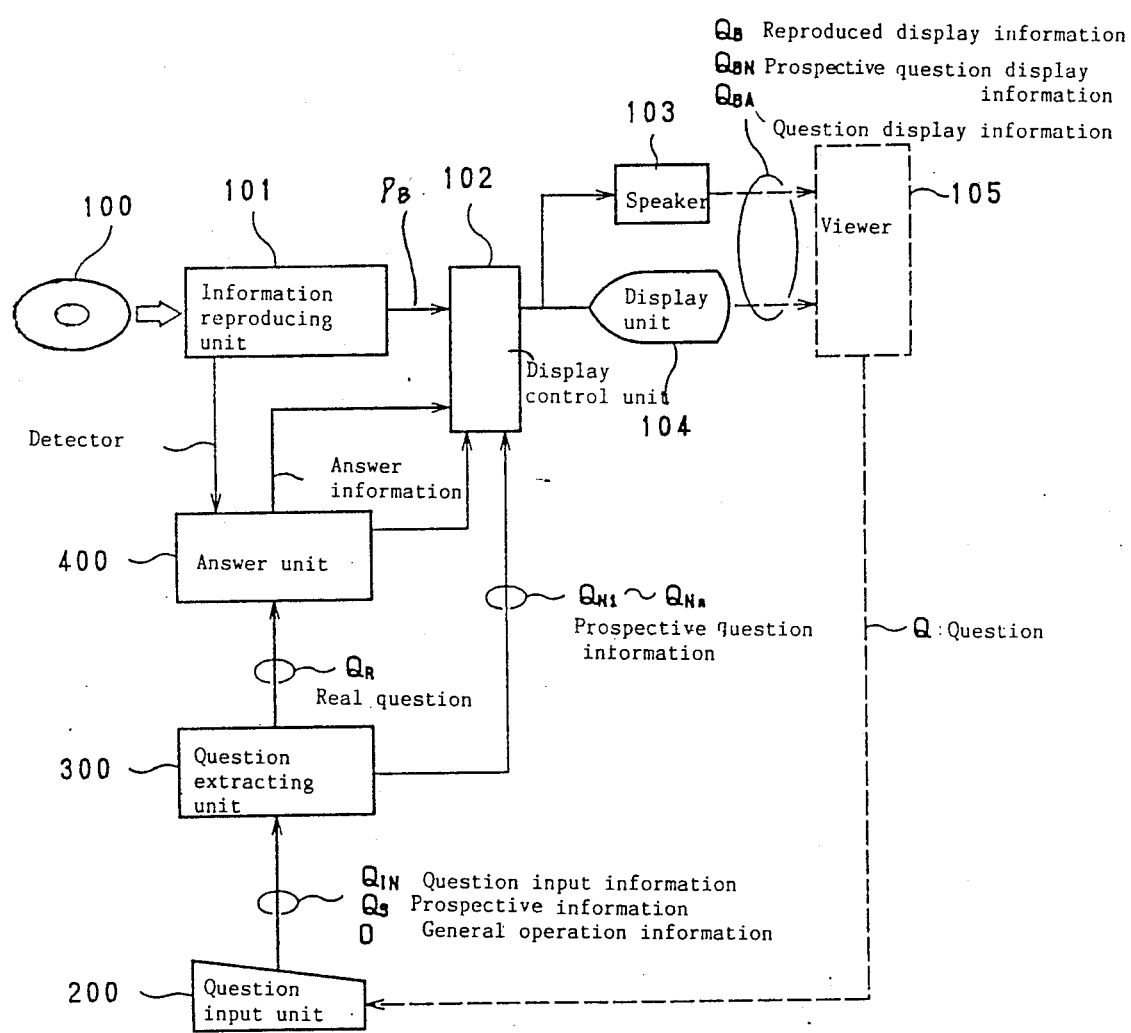
FIG. 1 is a block diagram of the systematic configuration of this invention.

Referring to FIG. 1 shows the whole configuration of an embodiment of this invention, the support device for question resolution of this invention is used together with an information reproducing equipment 101 such as a laser vision player. Therefore the systematic configuration of the information reproducing device is first described below.

In FIG. 1 video and audio information such as characters, images, sounds, and speeches is stored on an information storage medium 100 such as a laser vision disk. The stored information is read out as reproduced information with the information reproducing unit 101. The reproduced information $P_B$ is sent to a display control unit 102, and is output from a display unit 104 such as a CRT, and from a speaker 103. The viewer 105 can acquire some information from the displayed reproduced information $P_B$.

In the connection with the above-mentioned systematic information reproducing equipment, the support equipment for question resolution of this invention is provided with a question input unit 200 for inputting a question Q arising in viewer's mind 105, a question extracting unit 300 with which the viewer 105 extracts, on the basis of the input information, true question information $Q_R$, the answer of which the viewer 105 wants to know, and an answering unit 400 which searches for the answer to the real question information $Q_R$ by automatic retrieval. The answer information A is output from a display unit 104 through a display control unit 102. By the display of the output answer information A, the viewer 105 can deepen understanding on the question.

In the next place, the outline of operation is described below.

Now, assume that video and audio information (e.g., educational information) stored in the information storage medium 100 is read out with the information reproducing unit 101, and output, as reproduced information $P_B$, from the display unit 104 and the speaker 103 via the display control unit 102, and that the viewer 105 is watching the reproduced information. When on a picture of the reproduced information $P_B$, the viewer 105 has a question Q, the viewer inputs the question into the question input unit 200. As input question information $Q_{IN}$, the entered question is sent from the question input unit 200 to the question extracting unit 300.

The question extracting unit 300 selects some prospective question information $Q_{N1}$ to $Q_{Nn}$ which have been beforehand prepared. The selected pieces of prospective question information $Q_{N1}$ to $Q_{Nn}$ are output from the display unit 104 and the sneaker 103 via the display control unit as characters, images, sounds and speeches, thus presented to the viewer 105. The viewer 105 selects a piece of prospective question information corresponding to the viewer's own question Q out of displayed prospective question information $P_{BN}$, and enters it into the question input unit 200. The entered question is sent, as selected information $Q_S$, to the question extracting unit 300.

The question extracting unit 300 extracts real question information $Q_R$ corresponding to information $Q_S$ selected from prospective question information $Q_{N1}$ to $Q_{Nn}$ and sends it to the answering unit 400.

The answering unit 400 retrieves answer information A corresponding to the real question information $Q_R$ from a plurality of answer information retained in the answering unit 400, and outputs the answer information into the display unit 104 and speaker 103 via the display control unit 102. From the display unit 104 and the speaker 103, the answer display information $P_{BA}$ is output and presented to the viewer 105. When the presented answer information A is satisfactory for the viewer, the information reproducing unit 101 starts again reproduction. If the answer information is not satisfactory for the viewer, the above operations are repeated.

In such a way, the viewer 105 can resolve at once the question Q arising during reproduction of reproducible information $P_B$ without consulting any book or asking any person.

Question Input Unit 200

Figure 2:
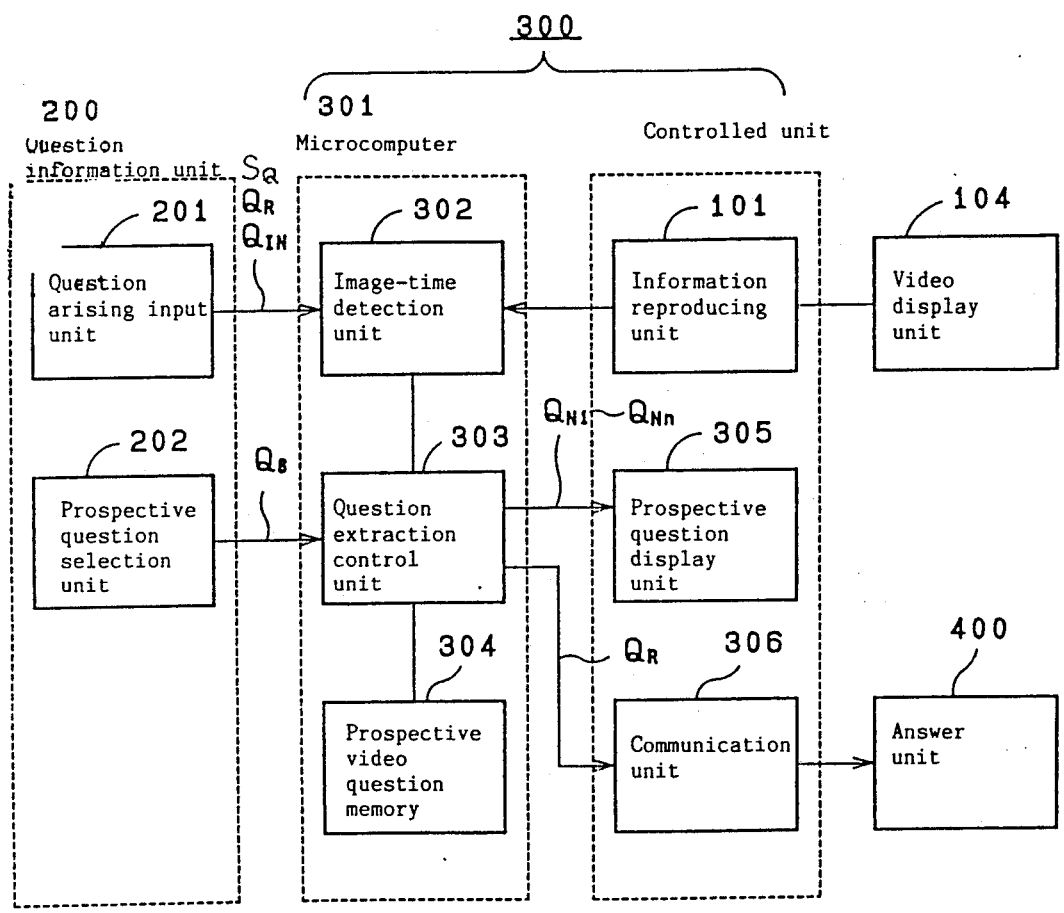
FIG. 2 is a block diagram of a question input unit and a question extracting unit.

The question input unit 200 in FIG. 2 contains a question arising input unit 201 that outputs question input information $Q_{IN}$ containing a question arising signal $S_Q$ for synchronizing with a reproduction display information $P_B$ at the time when a question Q arises, and which employs, for example, a microprocessor, and a prospective-question selector unit 202, for example, a key switch, for viewer's selection of any of prospective information $Q_{N1}$ to $Q_{Nn}$ when such a series of information is presented. The question arising signal $S_Q$ is output to a microcomputer in the question extracting unit 300. The prospective-question selector unit 202 outputs and sends selected question information $Q_S$ to the microcomputer 301. The question input unit 200 is electrically connected with electric wires to the question extracting unit 300, and also may be designed so that question input information $Q_S$ and general operation information 0 can be sent wirelessly to the question extracting unit 300 by optical transmission.

Question Extracting Unit 300

The question extracting unit 300, shown in FIG. 2, contains an image-time detector unit 302, a question extraction control unit 303, a prospective image question memory 304, a prospective question display unit 305, and a telecommunication unit 306 (output unit). In this configuration, the image-time detector unit 302, and the question extraction control unit 303 may be constructed of specialized hardware, although in this embodiment microcomputer 301 is used by application of control software stored in a ROM (Read Only Memory) in the microcomputer.

In response to a question arising signal $S_Q$ from the question arising input unit 201, the image-time detector unit 302 detects progressing condition of reproduced information $P_B$ at the time when a question Q arises. Without this detection process, the prospective question information $Q_{N1}$ to $Q_{Nn}$ corresponding to the question Q in synchronization with the reproduced information $P_B$ cannot be selected. For this reason, the image-time detector unit 302 accepts from the information reproducing unit 101 the time-frame number of reproduced information $P_B$ at the time when the question Q arises. The time-frame number is sent to a question extraction control unit 303.

Figure 3:
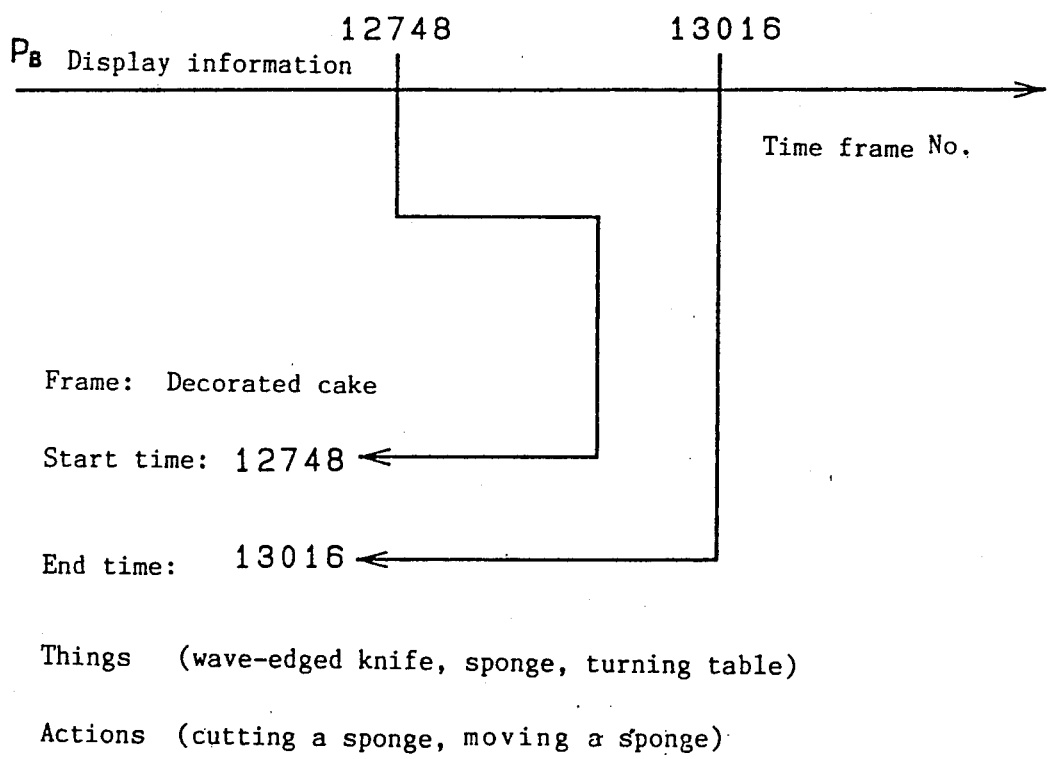
FIG. 3 is an illustration of an example of display information detection data.

The question extraction control unit 303 reads, from the prospective question information unit 304, data shown in FIG. 3 on the basis of the time frame number. The data are prospective questions $Q_{N1}$ to $Q_{Nn}$ in the above time frame number. When the frame number where a question Q arises is No. 13,000, the data shown in FIG. 3 is read out. The unit 303 extracts answer information A corresponding to real question information $Q_R$ in response to information $Q_S$ selected with the prospective-question selector unit 202.

The prospective question information unit 304 retains, for example, by using a RAM (Random Access Memory), several pieces of prospective question information $Q_{N1}$ to $Q_{Nn}$ supposed to raise a question as to any information contained in reproduced information $P_B$. The prospective question information $Q_{N1}$ to $Q_{Nn}$ is set to "things" or "actions" depending on the content of the question Q. Many of questions Q are classified into questions as to what a thing itself is and other questions as to how to act or work. As a typical example, in reproduced information $P_B$ on "how to make a decorated cake", such as birthday cake, questions Q about things relate to "wave-edged knife, sponge, turning table", etc., and questions as to actions relate to "cutting sponge, moving a sponge" etc. Display examples of thus classified prospective question information $Q_{N1}$ to $Q_{Nn}$ are shown in FIG. 4.

Figure 4:
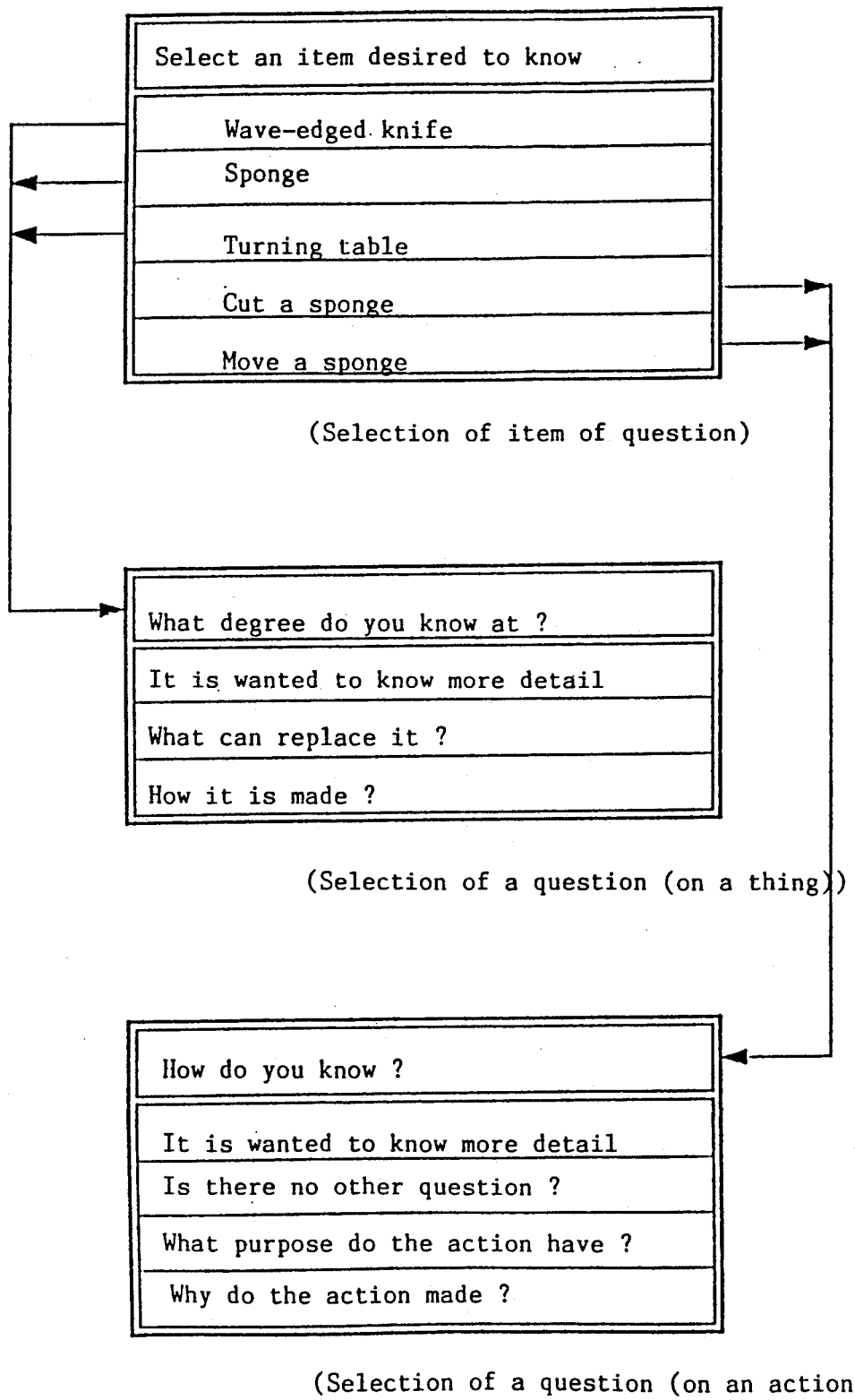
FIG. 4 is an explanatory example of question classification.

The prospective-question display unit 305 is, for example, a CRT (Cathod Ray Tube) display, which displays prospective question information $Q_{N1}$ to $Q_{Nn}$, for example, as shown in FIG. 4. The CRT may be specialized for the above display, but it is preferable to apply the CRT to combination use for information reproduction unit 101 to release the viewer 105 from trouble of watching two different screens.

The communication unit 306 transmits the real question information $Q_R$ output from the question extraction control unit 303 into an answering unit 400. As the communication unit 306, a communication interface such as the RS232C is used.

Figure 5:
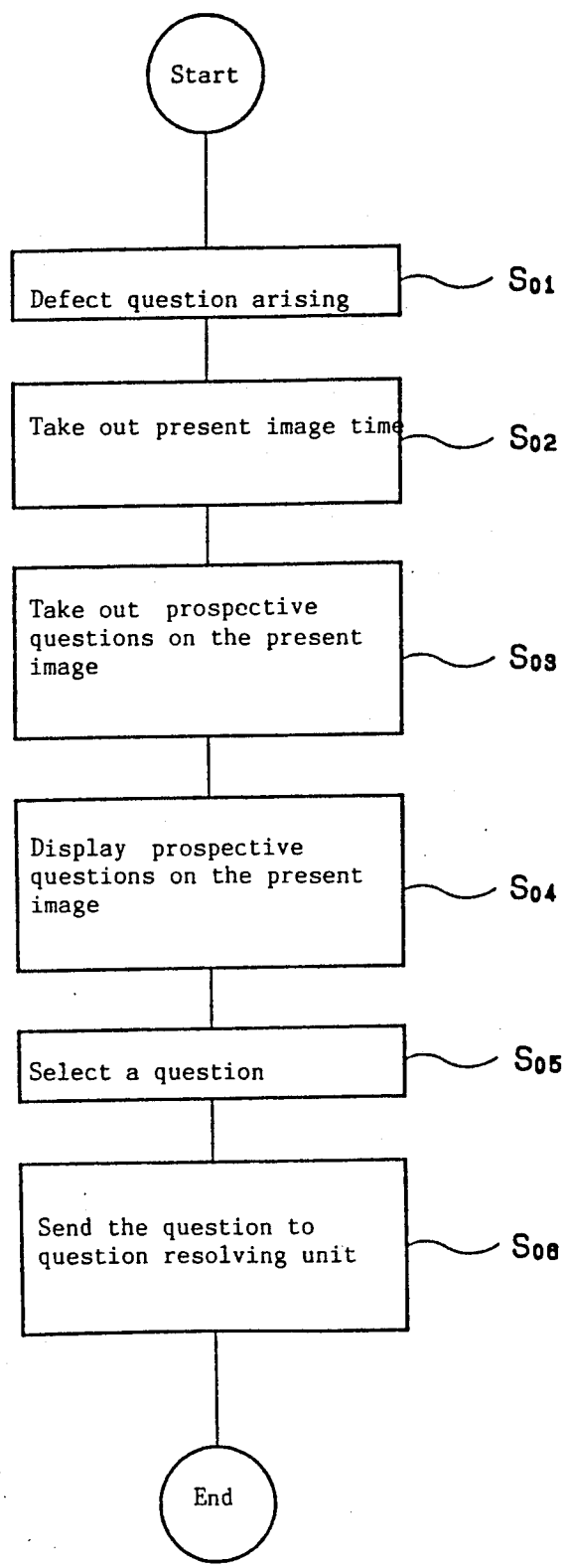
FIG. 5 is an overall operation flowchart of an question extracting unit.

The above-described operation flow of the question extracting unit 300 is shown in FIG. 5.

1. First, a viewer's question is detected by receiving input information from the question arising input unit 201, and the result is transmitted to the image-time detection unit 302 (S01).

2. Receiving the transmission, the image-time detection unit 302 sends the question to the question extraction control unit 303 (S02).

3. The question extraction control unit 303 takes prospective question information on the question corresponding to the image time out of the prospective image question memory (S03).

4. The prospective question information is displayed on the prospective question display unit 305 (S04).

5. The viewer selects a question from the prospective question information with the prospective-question selector unit 202 (S05).

6. The question extraction control unit 303 sends out the selected real-question information via a communication unit 306 to the answering unit 400 (S06).

Answering Unit 400

Figure 6:
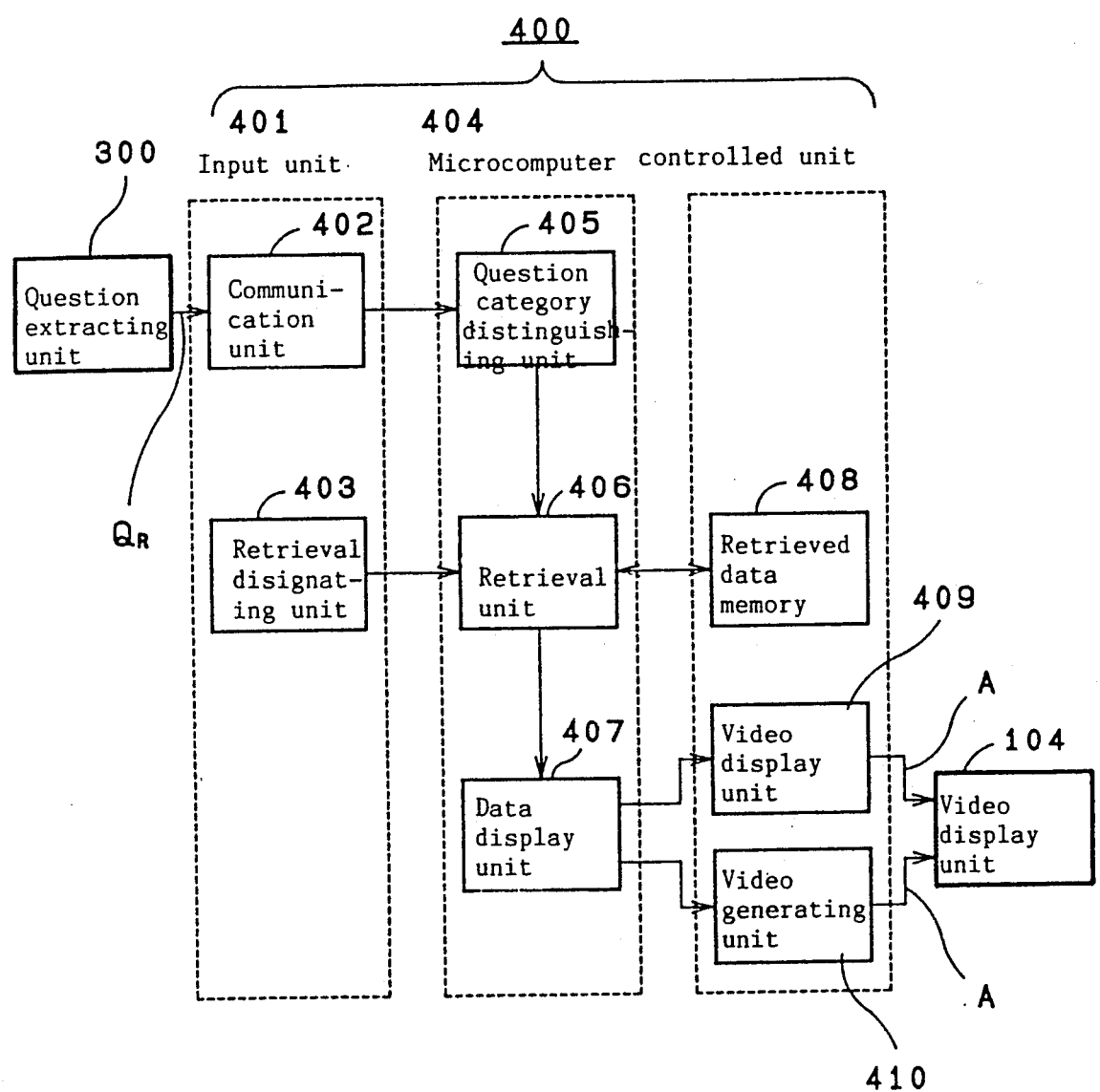
FIG. 6 is a block diagram of an answering unit.

The answering unit 400 whose configuration is shown in FIG. 6, is composed of a communication unit 402 and a retrieval designating unit 403, both of which form an input unit 401, a question category distinguishing unit 405, a retrieval unit 406, a data display unit 407, a retrieved-data memory 408, an image reproducing unit 409 and an image producing unit 410. In the above configuration, the question category distinguishing unit 405, the retrieval unit 406 and data display unit 407 in this invention are not constructed as special hardware but are formed of microcomputer 404 and a control program set in a ROM built in the micro-computer 404.

The communication unit 402 receives the real question information $Q_R$ from the question extracting unit 300.

The retrieval designating unit 403, used when the viewer 105 designates retrieval again because of insufficiency of the preceding retrieval result, outputs to the retrieval unit 406 a command to retrieve answer information A corresponding to the real question information $Q_R$.

Figure 8:
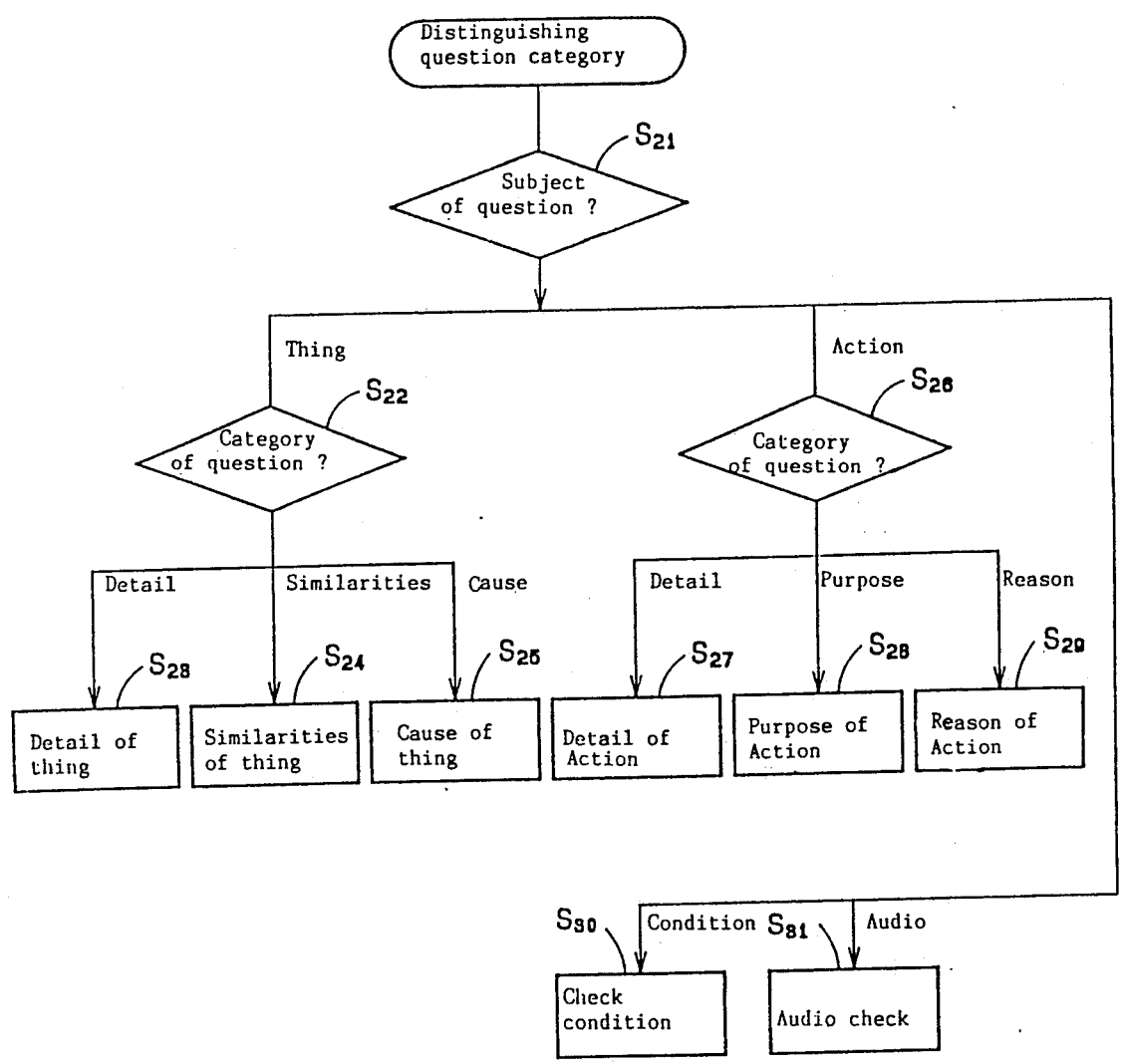
FIG. 8 is an operation flowchart for distinguishing the kinds of questions.

The question category distinguishing unit 405 distinguishes the category of the real question information $Q_R$ as shown in FIG. 4 (thing, or action, and degree of its content, etc.) and designates the information to be retrieved by the retrieval unit 406. An example of the flow of the question category distinguishment is shown in FIG. 8. In this flow it is first distinguished that the object of the question is any of things, actions, conditions or sounds. Upon this distinguishment, the question is further categorized, in the case of things for instance, to one of desires to know a thing in detail (details of a thing), to know things of the same kind as a specific thing (a group of things), to know the reason why a thing has come to a condition (reason of things) (S21 to S31).

Figure 10:
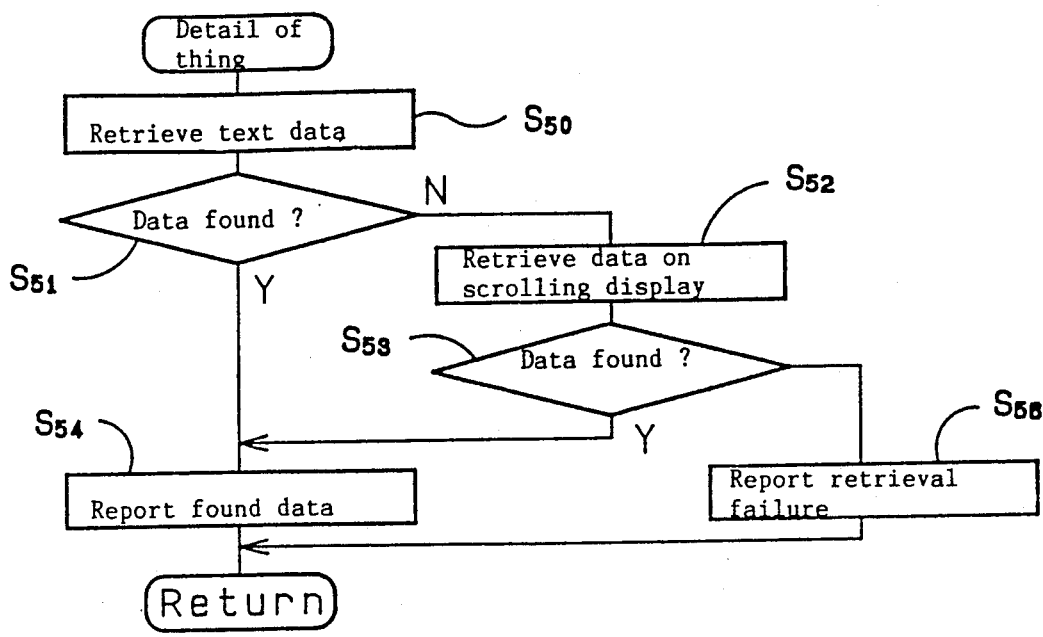
FIG. 10 is an operation flowchart for narrowing the information to the most suitable one.
Figure 11:
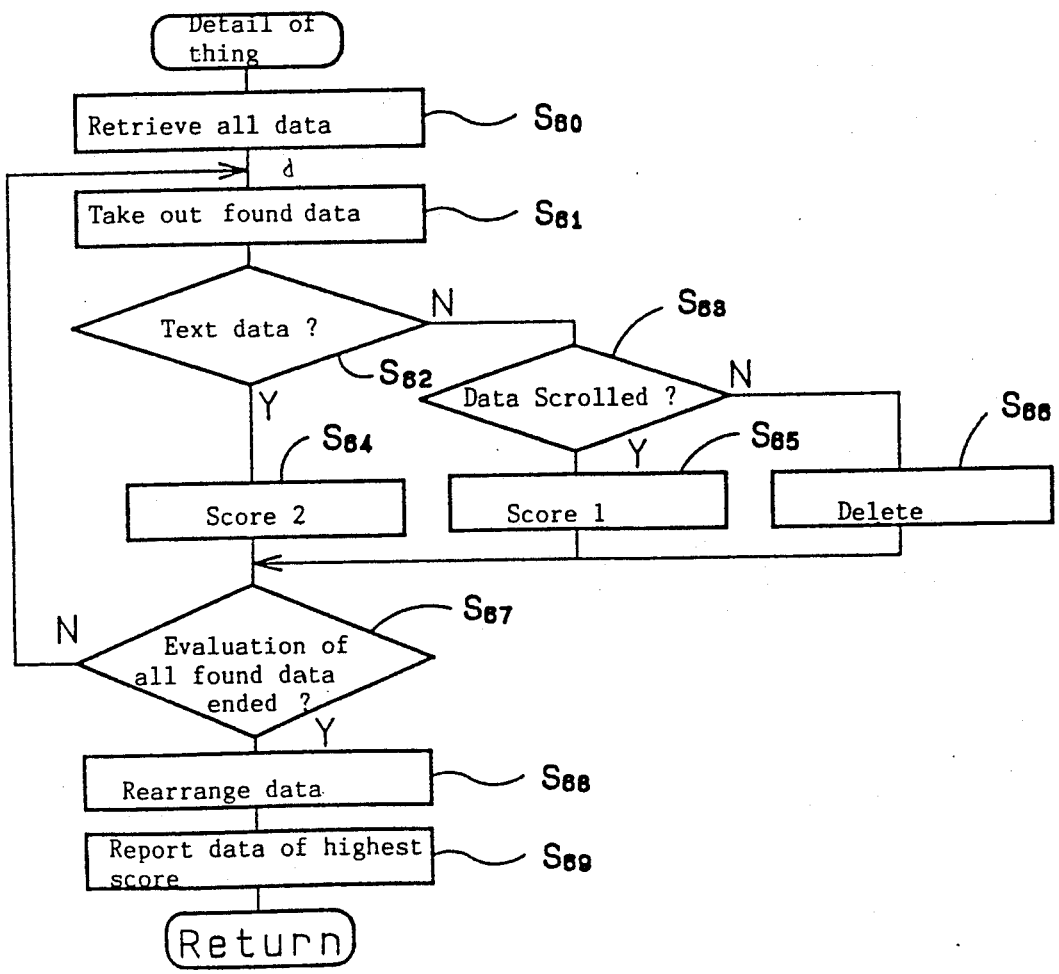
FIG. 11 is an operation flowchart of another process for narrowing the information.

By a command from the question category distinguishing unit 405 and the retrieval designating unit 403, the retrieval unit 406 retrieves data stored in a retrieval data memory 408, and sends to a data display unit 407 the data on the answer information A corresponding to the real question information $Q_R$. FIG. 10 shows, in the case of "details of a thing", a flow of search for the most suitable data at the time of retrieval. In the case of "Details of a Thing", the most suitable text for detailed explanation of the thing is first retrieved. If the text is not founds, the display is scrolled to retrieve as the next suitable text. If such a picture is not also found, it is concluded that no data is found (S50–S56). In another method, all the relevant data of this part are collected regardless of the kinds of media, and are ranked in connection with the media as in FIG. 11 (S60–S69).

Figure 9:
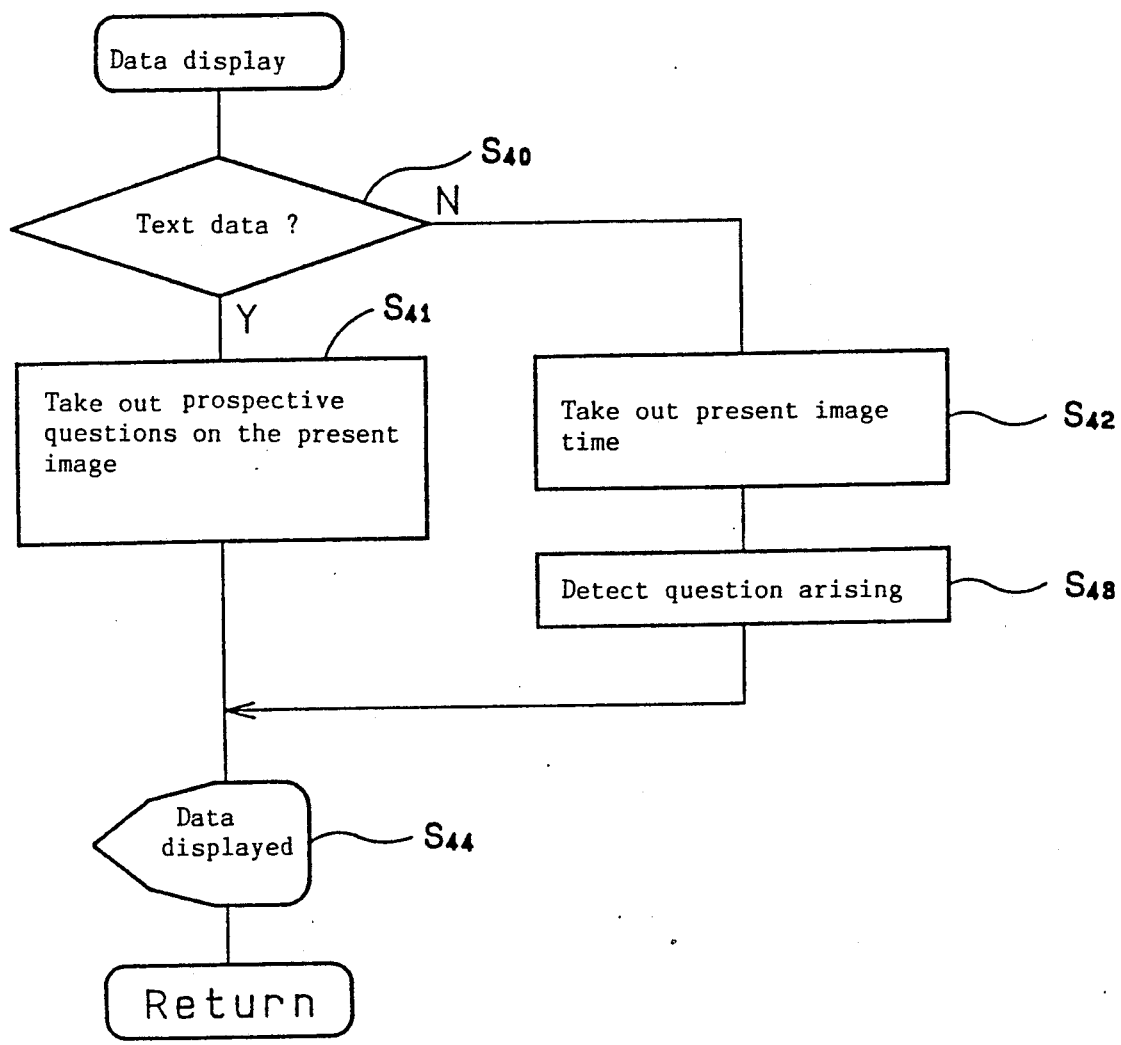
FIG. 9 is an operation flowchart for information display.

The data display unit 407 gives an image reproducing unit 409 a command depending on the form of retrieved data or gives an image generating unit 410 a command relating to display contents. The flow of data display is shown in FIG. 9.

The retrieval data memory 408 retains answer data for resolution of the question Q.

The image reproducing unit 409 serves as a buffer to hold video data on the answer information A corresponding to the real question information $Q_R$ and outputs the data to the display unit 104.

The image generating unit 410 converts data sent from the data display unit 407 into video data and outputs them to the display unit 104.

Figure 7:
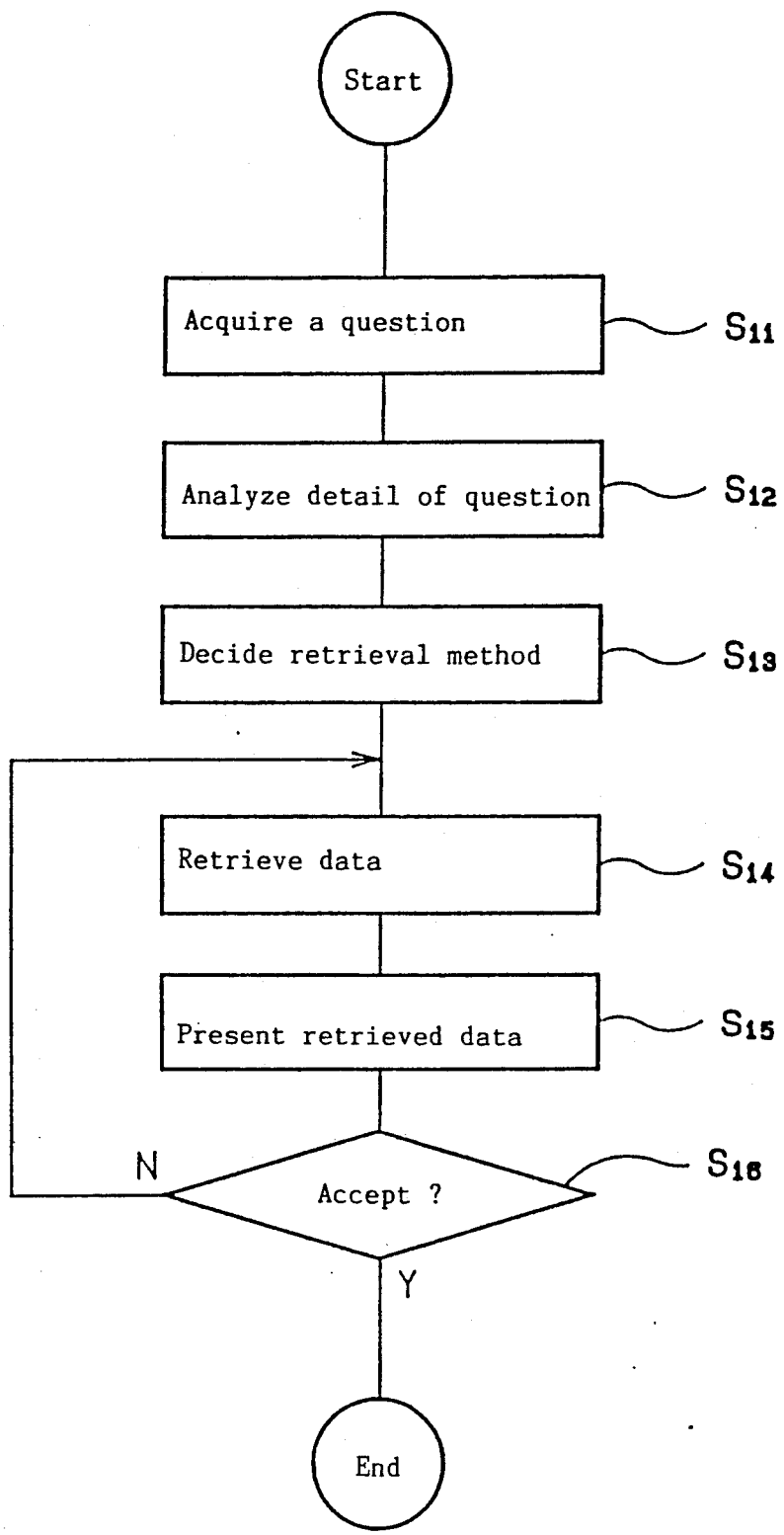
FIG. 7 is an overall operation flowchart of an answering unit.

FIG. 7 shows an outline of operation flow of the answer unit 400. In this figure, 1. The answer unit 400 acquires a question from the question extracting unit 300 through a communication unit 402 (S11).

2. Contents of the question are analyzed with the question category distinguishing unit 405 (S12).

3. Based on the analytical results, the question category distinguishing unit 405 decides the retrieval method and gives a command to the retrieval unit 406 (S13).

4. By the given method, the retrieval unit 406 retrieves data (S14).

5. The data display unit 407 presents the found data to the user (S15).

6. When the viewer designates retrieval again to the retrieval designating unit 403, the operation restarts at S14 or when the viewer does not designate, the operation ends (Y at S16).

Explanatory Embodiment

An application of this invention to a laser vision player is described below.

Figure 12:
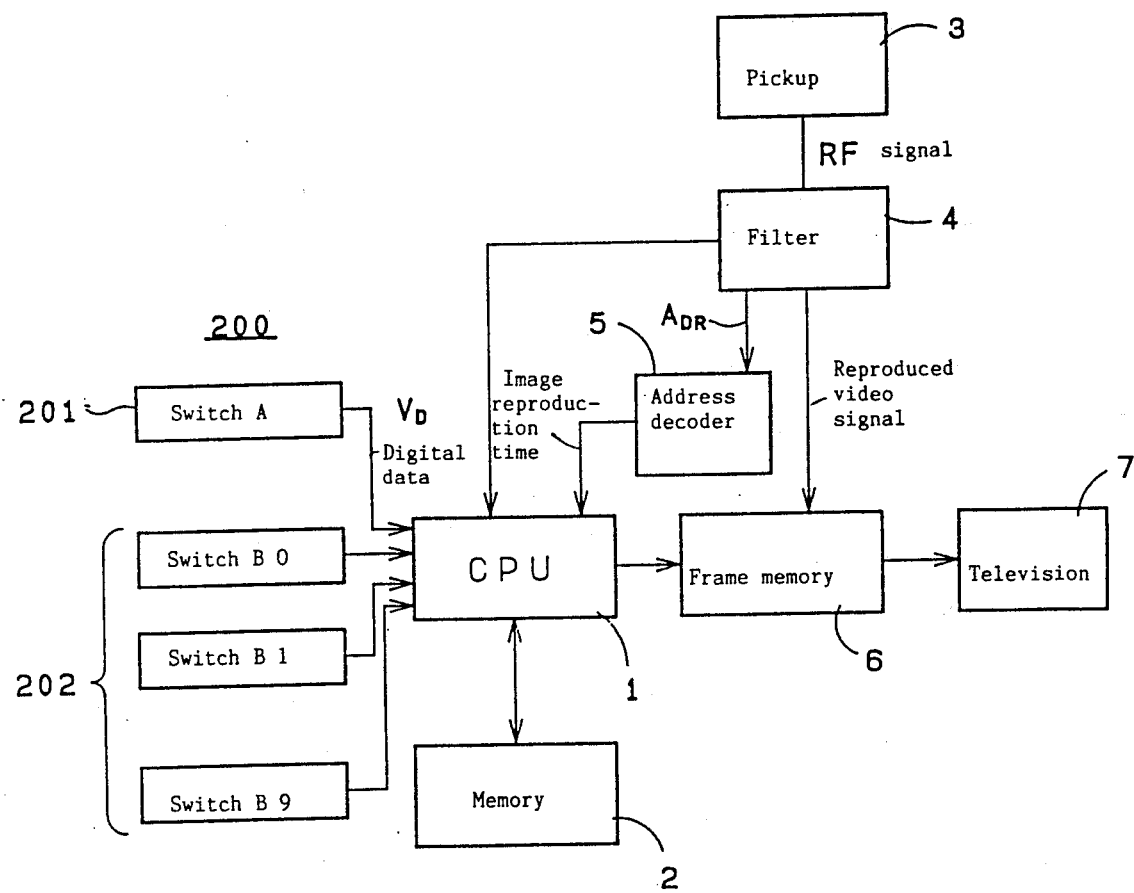
FIG. 12 is a block diagram of an embodiment of this invention.

In this embodiment, a laser vision player is used as an information reproducing unit 101 as shown in FIG. 12, a question input unit 200 is incorporated in a remote controller for operation of the laser vision player (refer to FIG. 13), a CPU incorporated in the laser vision player is also used for a question extracting unit 300 and an answer unit 400, and for setting a program to be executed, a television set is used as a speaker 103 and a display unit 104, and other necessary components are provided.

Figure 13:
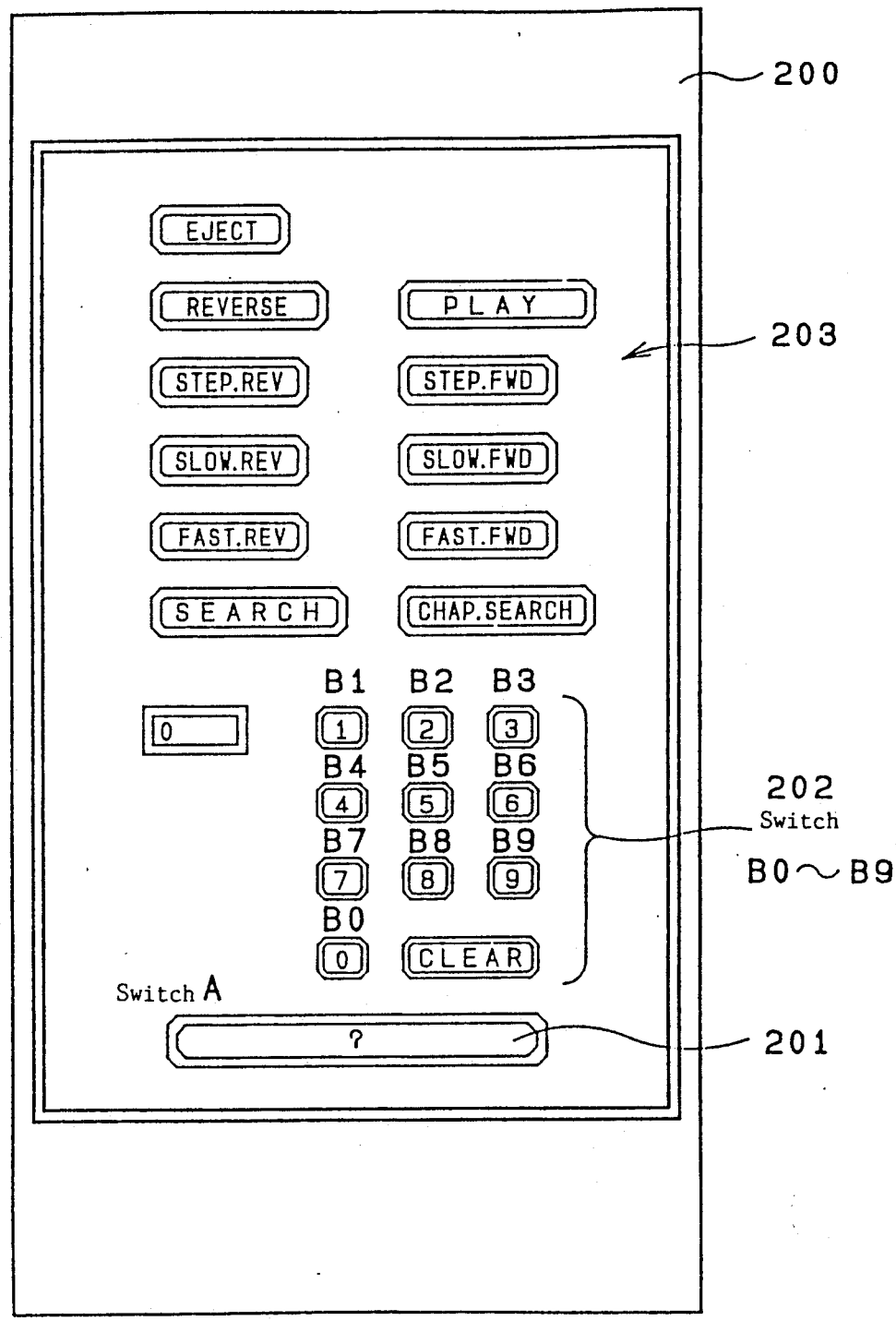
FIG. 13 is a front view of a question input unit.

In FIG. 12, a question input unit 200 has a push button switch A (question arising input unit 201) for inputting arising of a question by a viewer 105, and selector switches $B_0$ to $B_9$ (question arising input unit 202) for selection by the viewer 105 of the real question information $Q_R$ out of displayed prospective question information $Q_{N1}$ to $Q_{Nn}$. The front view of the question input unit 200 is shown in FIG. 13, where a group of keys usually operated are shown with a number 203.

The CPU 1 makes total control of the whole system in normal reproduction and in execution of the question extracting unit 300 and answer unit 400 of this invention. The CPU 1 executes such functions as the image-time detection unit 302, question extracting unit 303, prospective video question memory 304, prospective question display unit 305, and communication unit 306 in FIG. 2 as well as functions of the question category distinguishing unit 405, and retrieval unit 406, data display unit 407 in FIG. 6.

The memory 2 stores operation programs of the laser vision player and prospective question information $Q_{N1}$ to $Q_{Nn}$ (Refer to the prospective question information unit 304).

The pickup 3 reads out RF signals from an optical video disk (laser vision disk).

The filter 4 separates from the read-out RF signals reproduced video signals $V_V$ and the digital decoder $V_D$ of the same form as that of a compact disk.

The address decoder 5 extracts address data ADR from the $V_V$, and inputs the present reproduction time (refer to the time frame No. in FIG. 3) to the CPU 1.

The frame memory 6 stores reproduced video signals $V_V$ derived from a filter 4 (Refer to the image reproducing unit 409 and image generating unit 410 in FIG. 6.).

The television 7 reproduces, as reproduced information $P_B$, video data in the frame memory 6.

The configuration of the audio system is not shown in FIG. 12. However, it will accord with the configuration of ordinary laser vision players.

Figure 14:
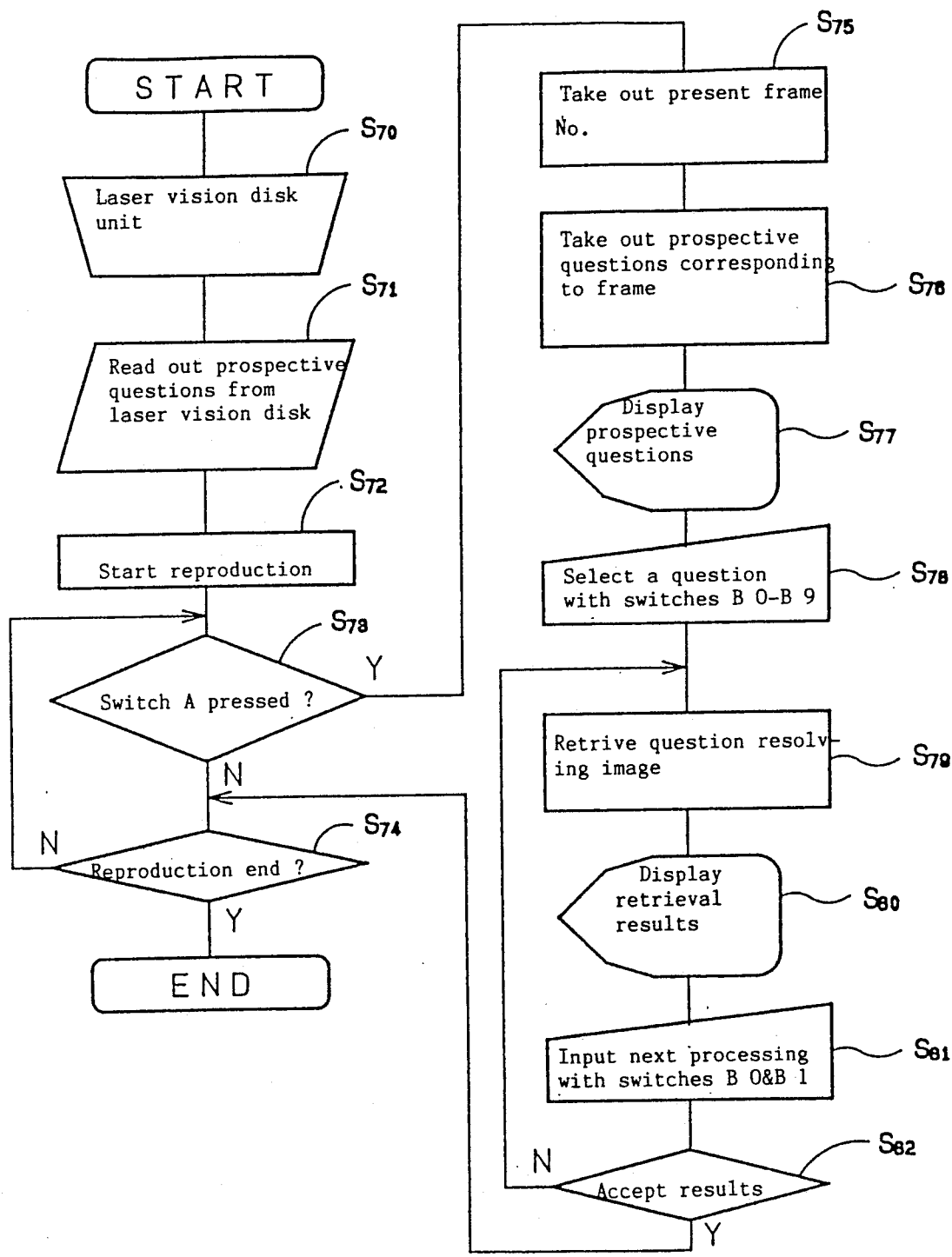
FIG. 14 is an overall operation flowchart of an embodiment of this invention.

The operation of the system is described below with reference to FIG. 14.

The normal operation flow as a laser vision player is executed in steps S70 to S74. When the system is mounted with a laser vision disk (S70), the CPU 1 reads out the prospective question information $Q_{N1}$ to $Q_{Nn}$ which has been stored in an area of a laser vision disk in the same form as the compact disk, and transfer them to the memory 2 for preliminary storage (S71). That is, the prospective question information $Q_{N1}$ to $Q_{Nn}$ has been stored in an area separated from reproducible original information $P_B$ on a laser vision disk intended to be reproduced. However, they may be stored in a separate disk.

By such transfer and storage of the prospective question information $Q_{N1}$ to $Q_{Nn}$, the preparation is completed. In the next place, operation enters into reproduction of the reproducible information $P_B$ (for example, an educational video on how to make a decorated cake as a birthday cake) (S72).

When the viewer 105 watching the reproduced information $P_B$ has a question Q, the viewer 105 presses the switch A. This condition is checked in step S73. When the switch A is not pressed (N in S73), the reproduction of the reproducible information $P_B$ is continued until the end of reproduction (S74). When the switch A is pressed (Y in S73), the CPU 1 takes out the frame in present reproduction (reproduction time) from the address decoder 5 (S75). Then the CPU 1 reads out, from the memory 2, the prospective question information $Q_{N1}$ to $Q_{Nn}$ (FIG. 16) preset between the start frame and the end frame which belong to the frame in reproduction (S76).

The read-out prospective question information $Q_{N1}$ to $Q_{Nn}$ (FIG. 15) is sent to the frame memory 6 and displayed on a TV screen 7 (S77).

While watching the displayed prospective question information $P_{BN}$, the viewer 105 selects real question information $Q_R$ corresponding to the viewer's own question with switches $B_0$ to $B_9$ (S78). The selected information $Q_S$ is input into the CPU 1 and the CPU 1 retrieves the answer information A corresponding to the real question information $Q_R$ from the memory 2 (S79), and sends it to the frame memory 6 to display its answer display information $P_{BA}$ on the TV screen 7 (S80). When as a result of this retrieval the question is solved, the operation returns via processing of the switch $B_1$ (FIG. 17) (S81) to the reproduction routine (S82), thus continuing reproduction the reproducible information $P_B$. On the other hand, if the retrieval result is unsatisfactory (FIG. 17), the step S82 is turned to N by pressing the switch $B_1$ (S81) and the operation returns to the step S79, and continues searching. The above-described operation is repeated every time a question Q arises.

As this invention may be embodied in different forms without departing from the spirit and essential characteristics thereof, the foregoing embodiments are illustrative and not restrictive, since the scope of the invention is defined by the appended claims rather than by within limits and bounds of the claims, or equivalence of such limits and bounds are therefore intended to embraced by the claims.

What is claimed is:

1. An apparatus for interactively providing questions and answers pertaining to recorded information being displayed to a user, said apparatus comprising:
   memory means for storing question categories, questions related to each of said categories, and answers for each of said questions,
   interrupt means for allowing said user to stop the displayed information when said user has a question related to said information,
   presentation means for displaying multiple question categories to the user when an interrupt from said interrupt means occurs,
   selection means for allowing the user to select a category from said multiple question categories, wherein said selected category corresponds to a user question,
   said presentation means displaying multiple questions related to said selected category,
   said selection means allowing the user to select a question from said displayed multiple questions, and
   answering means for providing an answer to said user from said memory means, wherein said answer corresponds to said selected question.

2. The apparatus of claim 1, wherein said interrupt means outputs an interrupt signal which marks a current user position within said displayed information, and
   said selection means outputting a signal to select one of said displayed multiple questions.

3. The apparatus of claim 2, wherein said selection means determines which question categories correspond to said current user position, by determining which frame within said information was being displayed when said interrupt occurred, and
   said presentation means reading said corresponding question categories from said memory means and displaying said corresponding question categories to the user.

4. The apparatus of claim 1, wherein said multiple question categories relate to information on objects or information on actions of said objects, correspond to a frame of said displayed information.

5. The apparatus of claim 1, wherein said answer means displays an answer stored in said memory means, which relates to said selected question.

6. The apparatus of claim 1, further comprising an optical video disk player for reading out stored information from an optical video disk as a storage medium and for displaying said information.

7. The apparatus of claim 1, wherein said question categories presented by said presentation means are displayed as character video information.

8. The apparatus of claim 1, wherein said question categories presented by said presentation means are presented as audio information.

9. The apparatus of claim 1, wherein said answers given by said answer means include video information.

10. A method for interactively providing questions and answers pertaining to recorded information being displayed to a user, said method comprising the steps of:
   storing question categories, questions related to each of said categories, and answers for each of said questions in a memory,
   allowing said user to interrupt the displayed information when said user has a question related to said information,
   displaying multiple question categories to the user when an interrupt occurs,
   allowing the user to select a category from said multiple question categories, wherein said selected category correspond to a user question,
   displaying multiple questions related to said selected category,
   allowing the user to select a question from said displayed multiple questions, and
   displaying an answer to said user, wherein said answer corresponds to said selected question.

11. The method of claim 10, further comprising the steps of:
   outputting an interrupt signal, when said user interrupts the information, which marks a current user position within said displayed information, and
   selecting one of said displayed multiple questions, by outputting a selection signal which represent said selected signal in said memory.

12. The method of claim 11, further comprising the steps of:
   determining which question categories correspond to said current user position, by determining which frame within said information was being displayed when said interrupt occurred,
   reading said corresponding question categories from said memory, and
   displaying said corresponding question categories to the user.

13. The method of claim 10, further comprising the step of:
   separating said multiple question categories into information related to objects and information related to actions of said objects, wherein said objects and said action relate to a frame of said displayed information at which said interrupt occurred.

14. The method of claim 10, further comprising the step of:
   displaying an answer stored in said memory means, which relates to said selected question.

15. The method of claim 10, further comprising the step of:
   using an optical video disk player for reading out said information from an optical video disk and displaying said information.

16. The method of claim 10, further comprising the step of displaying said answer as character video information.

17. The method of claim 10, further comprising the step of displaying said answer as audio information.

18. The method of claim 10, further comprising the step of displaying said answer as video information.

* * * * *